US012647149B2

(12) United States Patent
Ramesh

(10) Patent No.: US 12,647,149 B2
(45) Date of Patent: \*Jun. 2, 2026

(54) FULL-DUPLEX CABLE MODEM CALIBRATION

(71) Applicant: MAXLINEAR, INC., Carlsbad, CA (US)

(72) Inventor: Sridhar Ramesh, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,835

(22) Filed: Nov. 15, 2022

(65) Prior Publication Data

US 2023/0188179 A1     Jun. 15, 2023

Related U.S. Application Data

(63) Continuation of application No. 16/272,345, filed on Feb. 11, 2019, now Pat. No. 11,502,723.

(60) Provisional application No. 62/636,480, filed on Feb. 28, 2018.

(51) Int. Cl.
| | |
|---|---|
| *H04B 3/23* | (2006.01) |
| *H04L 5/14* | (2006.01) |
| *H04L 12/28* | (2006.01) |

(52) U.S. Cl.
CPC ................. *H04B 3/23* (2013.01); *H04L 5/14* (2013.01); *H04L 12/2801* (2013.01)

(58) Field of Classification Search
CPC .......... H04B 3/23; H04L 5/14; H04L 12/2801
See application file for complete search history.

(56) References Cited

U.S. PATENT DOCUMENTS

| | | | | |
|---|---|---|---|---|
| 5,606,534 | A * | 2/1997 | Stringer ................. | G01B 11/00 367/128 |
| 6,633,604 | B1 * | 10/2003 | Demjanenko ......... | H04L 5/1438 375/242 |
| 7,477,682 | B2 * | 1/2009 | LeBlanc .............. | H04M 11/062 704/E19.044 |
| 7,555,661 | B2 * | 6/2009 | Luu .................... | H04N 21/4436 455/574 |
| 7,600,003 | B1 * | 10/2009 | Okmianski ......... | H04L 41/0893 709/224 |
| 8,644,127 | B2 * | 2/2014 | Biyani ...................... | H04J 1/12 370/201 |
| 9,531,562 | B2 * | 12/2016 | Currivan ............. | H04L 25/0226 |
| 9,826,263 | B2 * | 11/2017 | Zinevich .............. | H04N 21/242 |
| 10,003,405 | B2 * | 6/2018 | Bernstein ........... | H04L 12/2801 |

(Continued)

*Primary Examiner* — Lisa Hashem
(74) *Attorney, Agent, or Firm* — Buchalter; Jason W. Croft

(57) ABSTRACT

A cable modem comprises transmitter circuitry, receiver circuitry, and memory. Upon power up of the cable modem in the field, the transmitter circuitry transmits one or more first signals into a network. The receiver circuitry measure echoes of the transmitted one or more first signals. The receiver circuitry generates an installation figure of merit based on the measured echoes and factory-calibration echo measurements stored in the memory. The communication device begins DOCSIS® network registration if the installation quality measurement meets a determined requirement and generates a notification to troubleshoot the installation of the communication device if the installation quality measurement does not meet a determined requirement.

19 Claims, 8 Drawing Sheets

(56)                 References Cited

U.S. PATENT DOCUMENTS

| | | | | |
|---|---|---|---|---|
| 10,033,482 | B2 * | 7/2018 | Bae | H04B 7/0413 |
| 10,305,706 | B2 * | 5/2019 | Yagil | H04B 3/23 |
| 10,367,631 | B2 * | 7/2019 | Chapman | H04L 5/1461 |
| 10,374,711 | B2 * | 8/2019 | Ke | H04J 14/0247 |
| 10,476,631 | B2 * | 11/2019 | Williams | H04L 27/2649 |
| 10,505,571 | B1 * | 12/2019 | Yagil | H04B 1/10 |
| 10,601,462 | B2 * | 3/2020 | Walley | H04L 12/6418 |
| 10,700,736 | B2 * | 6/2020 | Ramesh | H04L 5/14 |
| 10,757,002 | B2 * | 8/2020 | Huh | H04L 12/403 |
| 10,763,915 | B2 * | 9/2020 | Sun | H04B 3/487 |
| 10,917,187 | B2 * | 2/2021 | Oksman | H04L 12/2898 |
| 11,005,526 | B2 * | 5/2021 | Walley | H04B 3/20 |
| 11,133,840 | B2 * | 9/2021 | Goichberg | H04N 21/6168 |
| 11,133,915 | B2 * | 9/2021 | Kol | H04L 5/1469 |
| 11,146,470 | B2 * | 10/2021 | Gunasekara | H04L 43/0811 |
| 11,290,761 | B2 * | 3/2022 | Zinevich | H04L 43/50 |
| 11,391,830 | B2 * | 7/2022 | Au | H04W 48/16 |
| 11,394,523 | B2 * | 7/2022 | Cloonan | H04B 3/232 |
| 11,411,603 | B2 * | 8/2022 | Strobel | H04B 1/38 |
| 11,502,723 | B2 * | 11/2022 | Ramesh | H04L 5/14 |
| 11,949,531 | B2 * | 4/2024 | Yates | H04L 12/2856 |
| 2002/0065907 | A1 * | 5/2002 | Cloonan | H04L 41/5006 |
| | | | | 709/228 |
| 2002/0080868 | A1 * | 6/2002 | Bunn | H04N 21/64322 |
| | | | | 375/222 |
| 2003/0007211 | A1 * | 1/2003 | Gummalla | H04L 47/11 |
| | | | | 398/99 |
| 2004/0233926 | A1 * | 11/2004 | Cummings | H04L 12/56 |
| | | | | 370/437 |
| 2004/0244043 | A1 * | 12/2004 | Lind | H04N 7/17309 |
| | | | | 725/111 |
| 2005/0025145 | A1 * | 2/2005 | Rakib | H04L 12/407 |
| | | | | 370/389 |
| 2005/0078699 | A1 * | 4/2005 | Cummings | H04L 12/2856 |
| | | | | 370/437 |
| 2005/0122996 | A1 * | 6/2005 | Azenkot | H04L 41/083 |
| | | | | 370/477 |
| 2005/0249245 | A1 * | 11/2005 | Hazani | H04L 5/06 |
| | | | | 370/485 |
| 2008/0089399 | A1 * | 4/2008 | Azenko | H04L 12/2801 |
| | | | | 375/222 |
| 2009/0257579 | A1 * | 10/2009 | Takada | H04B 3/23 |
| | | | | 379/406.08 |
| 2014/0307763 | A1 * | 10/2014 | Eriksson | H04B 3/46 |
| | | | | 375/222 |
| 2015/0103981 | A1 * | 4/2015 | Berg | H04M 3/306 |
| | | | | 379/1.04 |
| 2018/0234130 | A1 * | 8/2018 | Chapman | H04B 3/23 |
| 2018/0287659 | A1 * | 10/2018 | Ramesh | H04L 5/14 |
| 2018/0294941 | A1 * | 10/2018 | Chapman | H04B 3/487 |
| 2018/0343031 | A1 * | 11/2018 | Yagil | H04B 3/232 |
| 2019/0020521 | A1 * | 1/2019 | Finkelstein | H04L 5/006 |
| 2019/0044626 | A1 * | 2/2019 | Hewavithana | H04L 25/0222 |
| 2019/0229981 | A1 * | 7/2019 | Chappell | G01R 31/08 |
| 2019/0230022 | A1 * | 7/2019 | Huh | H04L 43/12 |
| 2019/0288742 | A1 * | 9/2019 | Walley | H04L 5/18 |
| 2019/0296791 | A1 * | 9/2019 | Walley | H04B 3/20 |
| 2020/0105289 | A1 * | 4/2020 | Onizuka | H04S 7/305 |
| 2020/0204257 | A1 * | 6/2020 | Krampl | H04Q 11/0067 |
| 2020/0358690 | A1 * | 11/2020 | Huh | H04L 12/2801 |
| 2023/0098958 | A1 * | 3/2023 | Maricevic | H03F 3/62 |
| | | | | 330/52 |

* cited by examiner

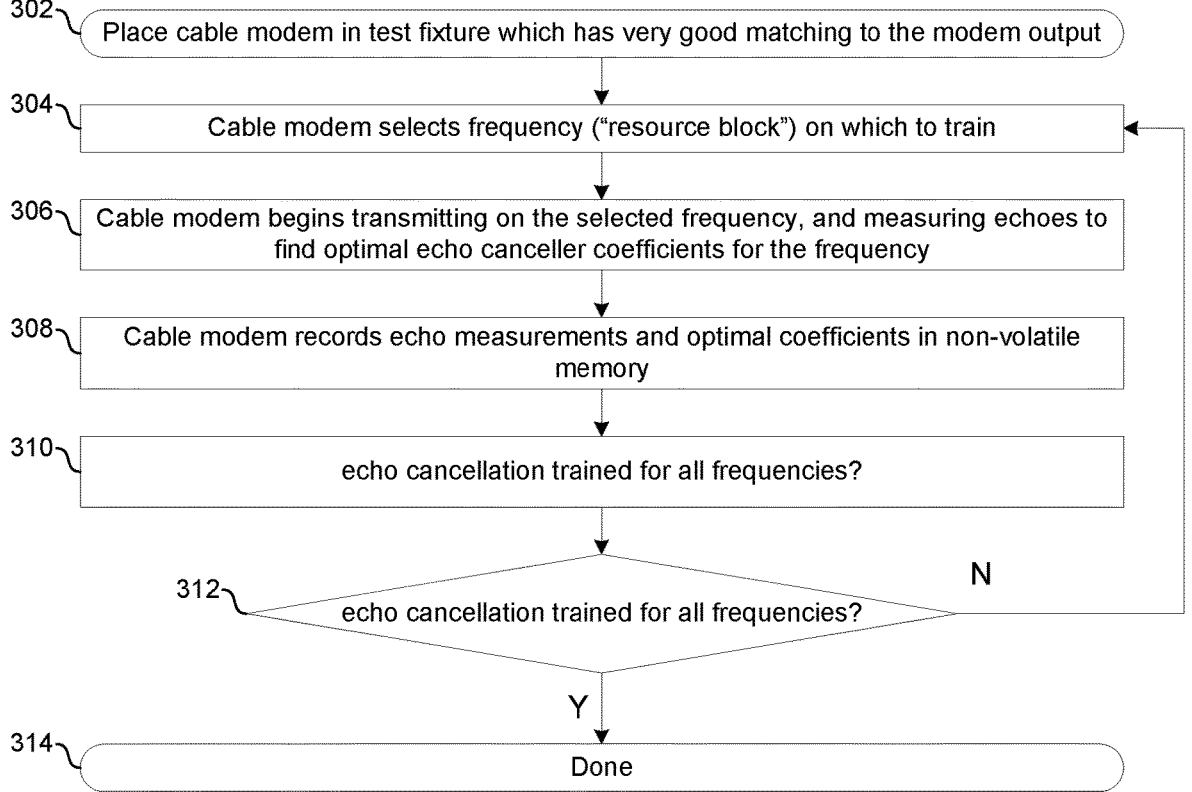

302 — Place cable modem in test fixture which has very good matching to the modem output 304 — Cable modem selects frequency ("resource block") on which to train 306 — Cable modem begins transmitting on the selected frequency, and measuring echoes to find optimal echo canceller coefficients for the frequency 308 — Cable modem records echo measurements and optimal coefficients in non-volatile memory 310 — echo cancellation trained for all frequencies?

312 — echo cancellation trained for all frequencies?    N

Y

314 — Done

FIG. 3

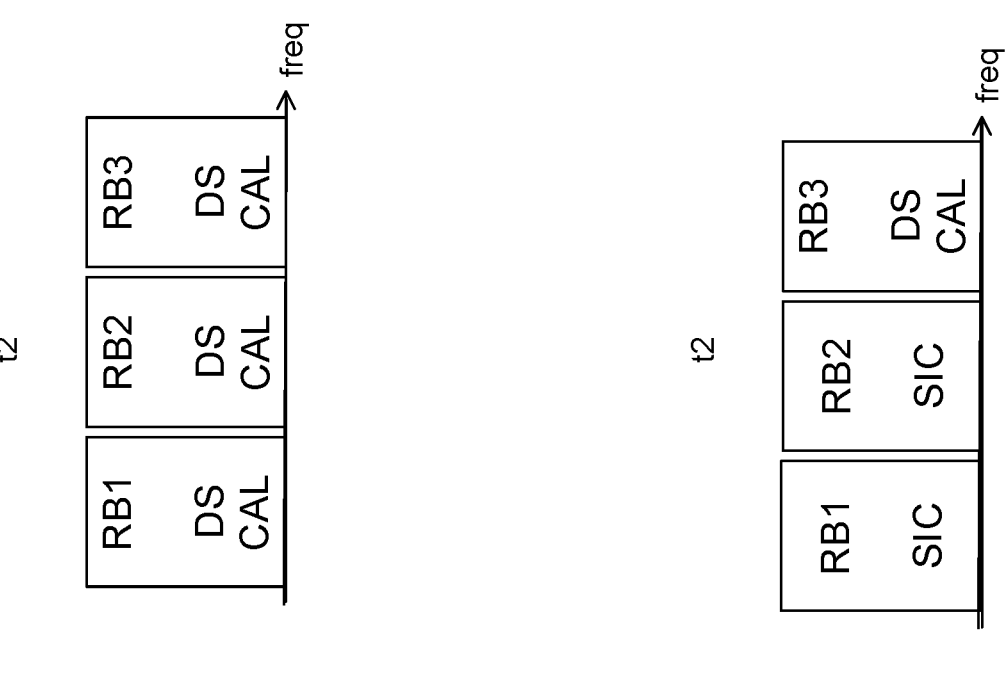
FIG. 5A
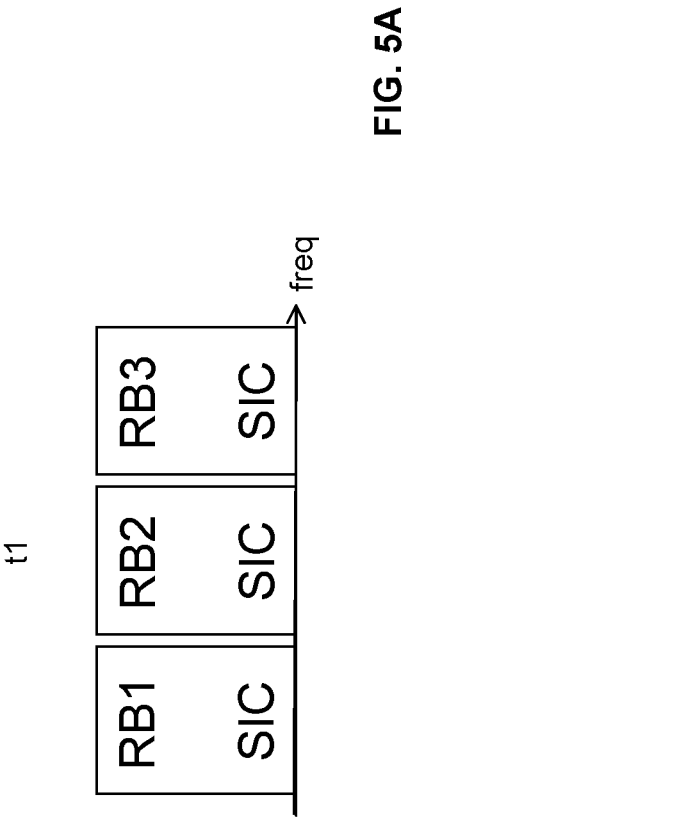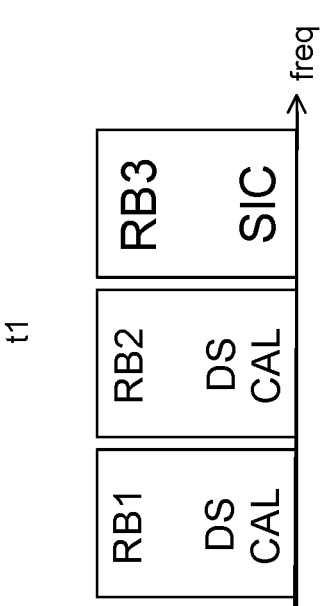
FIG. 5B

602 — Cable modem connected to network

604 — Cable modem measures echoes across frequencies

606 — Score generated based on comparison of measured echoes to values recorded during factory calibration 608 — Score is a passing score?

N

Y

610 — Installation complete, register with network

612 — Installer instructed to begin troubleshooting (e.g., try a different coax outlet)

FULL-DUPLEX CABLE MODEM CALIBRATION

PRIORITY CLAIM

This application is a continuation of U.S. patent application Ser. No. 16/272,345 filed Feb. 11, 2019, which claims the benefit of priority to U.S. Provisional Patent Application 62/636,480 filed Feb. 28, 2018, each of which are hereby incorporated herein by reference in their entireties.

INCORPORATION BY REFERENCE

U.S. patent application Ser. No. 15/938,937 titled Full Duplex DOCSIS Cable Modem Echo Cancellation with Training and filed Mar. 28, 2018, is hereby incorporated herein by reference in its entirety.

BACKGROUND

Limitations and disadvantages of conventional and traditional approaches to cable modems will become apparent to one of skill in the art, through comparison of such systems with some aspects of the present invention as set forth in the remainder of the present application with reference to the drawings.

BRIEF SUMMARY OF THE INVENTION

A system and/or method is provided for full-duplex cable modem calibration, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 shows an example process for calibration of a full-duplex cable modem.

FIG. 5A shows a first example calibration process for a full-duplex cable modem.

FIG. 5B shows a second example calibration process for a full-duplex cable modem.

DETAILED DESCRIPTION OF THE INVENTION

Figure 1A:
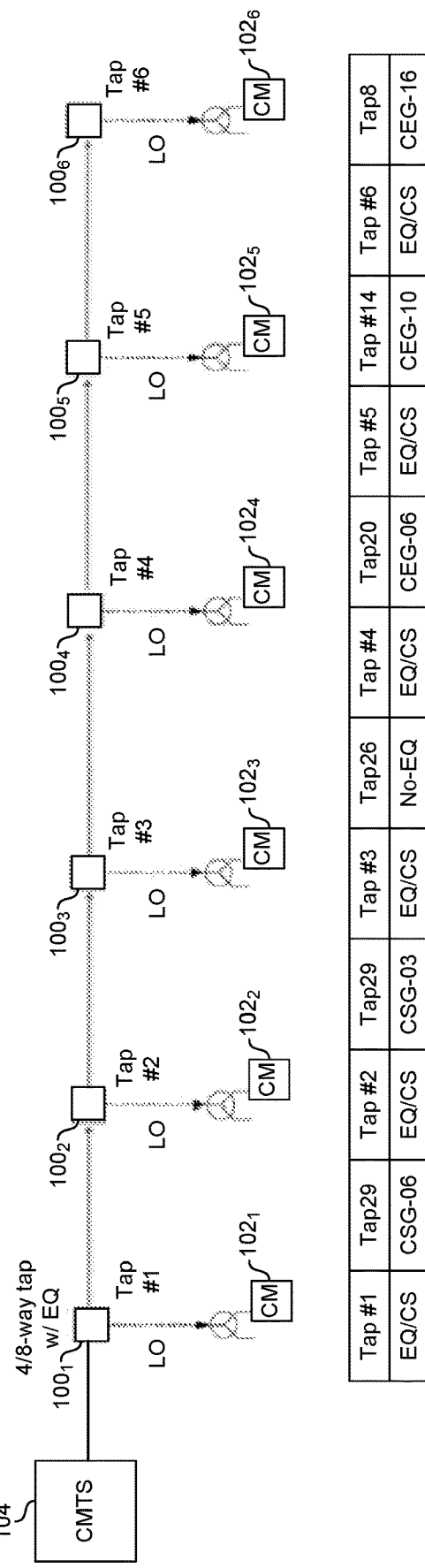
FIG. 1A illustrates an example cable network in which echo may occur.

FIG. 1A illustrates an example cable network in which echo may occur. Shown in FIG. 1A is a cable network (or portion thereof) 100.

The cable network 100 comprise various hardware and/or software resources for communication of signals over a cable network (e.g., a hybrid fiber coaxial (HFC) network), in compliance with one or more cable standards. For example, the cable network may be configured as a DOCSIS (Data Over Cable Service Interface Specification) network. In such implementations, the cable network 100 may comprise a cable modem termination system (CMTS) 104 that handles communication of signals to and/or from a plurality of cable modems (CMs) 102. In this regard, the cable modems 102 may represent the client devices in a DOCSIS network—e.g., typically deployed within clients' premises (homes and businesses), and the CMTS 104 represents the network-side controller. In the portion of cable network 100 shown in FIG. 1A, six cable modems $102_1$-$102_6$ are illustrated, connected to cable network via corresponding taps $100_1$-$100_6$, with the CMTS 104 on the other end of the cable network. Each of the taps 1-6 may be a CS/EQ 4/8-way tap.

The cable network 100 may be configured as a full-duplex (FDX) DOCSIS network. In an full-duplex DOCSIS network, upstream (US) and downstream (DS) signals can be sent onto the cable network at the same time on overlapping frequencies. This is in contrast to a frequency division duplex (FDD) network in which upstream signals are transmitted on different frequencies than downstream signals. In various implementations, the cable modems 100 may operate in FDD (frequency division duplex) mode, whereas the CMTS 104 may operate in full-duplex mode with cancellation of downstream signals leaking into upstream receive path.

A full-duplex mode may, however, introduce certain issues. For example, echoes of a cable modem's upstream transmissions may cause interference the cable modem's receiver. An example signal profile at a particular tap (e.g., tap 6) is shown in FIG. 1B.

Figure 1B:
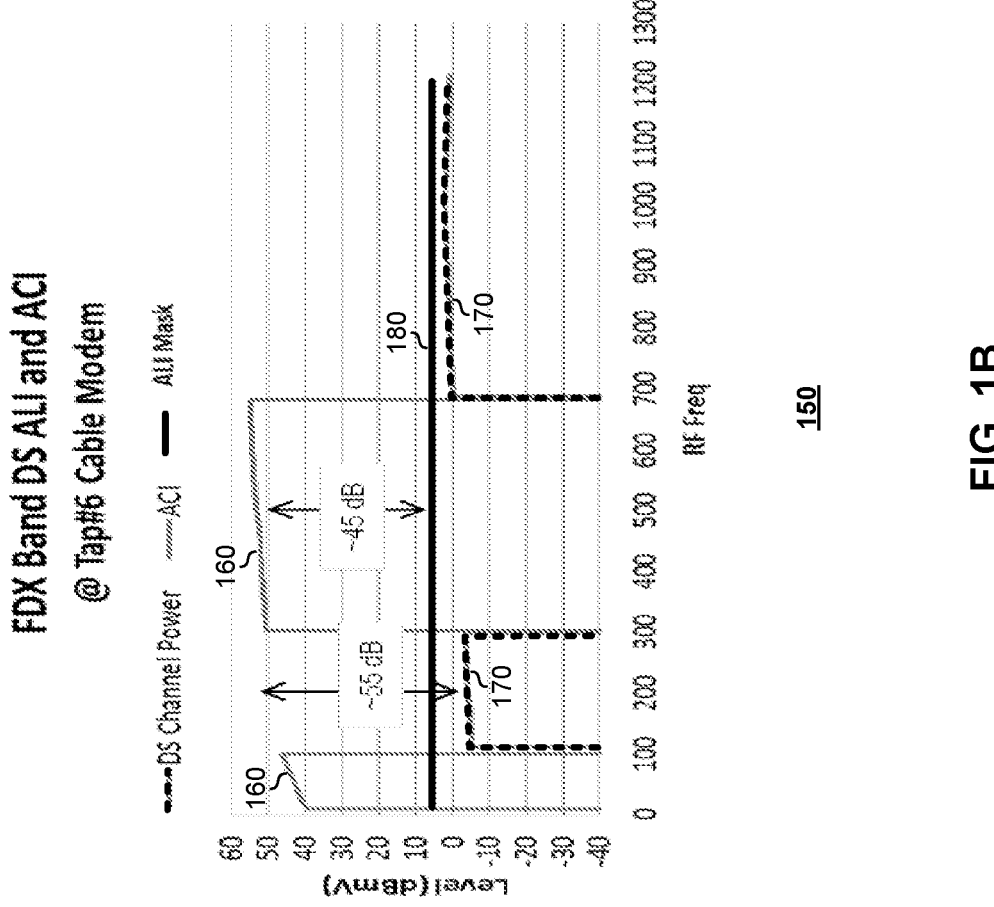
FIG. 1B illustrates an example radio frequency (RF) signal profile at a cable modem in a cable network.

FIG. 1B illustrates an example radio frequency (RF) signal profile at a cable modem in a cable network. The signal profile 150 may represent an example signal transmission/reception profile at a particular point in a full-duplex DOCSIS network. For example, the signal profile 150, as shown in FIG. 1B, may correspond to tap 6 in the cable network 100 of FIG. 1A. Signal profile 150 depicts downstream (DS) signal 170, as well as ACI (adjacent channel interference) 160 and ALI (adjacent leakage interference) mask 180. Despite being on a different channel than the desired receive signal, the strength of the ACI may de-sense the receiver. The ALI is co-channel interference resulting from the transmit signal leaking into the receive band. As illustrated in FIG. 1B, effects of US signals on the DS signals may be substantial. For example, US to DS signal power at the cable modem can be as high as ~55 dB. Thus, self-ACI and ALI may degrade the SNR of the DS signal such that error rates exceed a tolerable threshold.

Accordingly, a full-duplex cable modem in accordance with this disclosure may comprise circuitry configured to perform echo cancellation (EC) to cancel at least some of the interference resulting from echoes. For example, with respect to the signal profile 150, echo cancellation target reducing ACI by approximately 50 dB and reducing ALI by approximately 55 dB to ensure error rates below a determined threshold for a 4K QAM DS signal.

Use of echo cancellation in an full-duplex cable modem may eliminate a need for switched diplexer filters (or other such circuitry which can be costly and introduce other problems), while offering flexibility for diverse full-duplex spectrum evolution roadmaps with a single cable modem design.

Echo cancellation performance can, however, be sensitive to variations in cable modem components as well as to the environment/network (e.g., aging of components, temperature, radiated interference from nearby devices, etc.) in which the cable modem operates. Accordingly, aspects of this disclosure provide for built-in cable modem factory calibration as well as built-in run-time diagnostics to aid in successful deployment of the cable modem (e.g., to enable customers to self-install their cable modem, thus saving the cable operator the expense of requiring an on-premises technician to perform the install).

Figure 2:
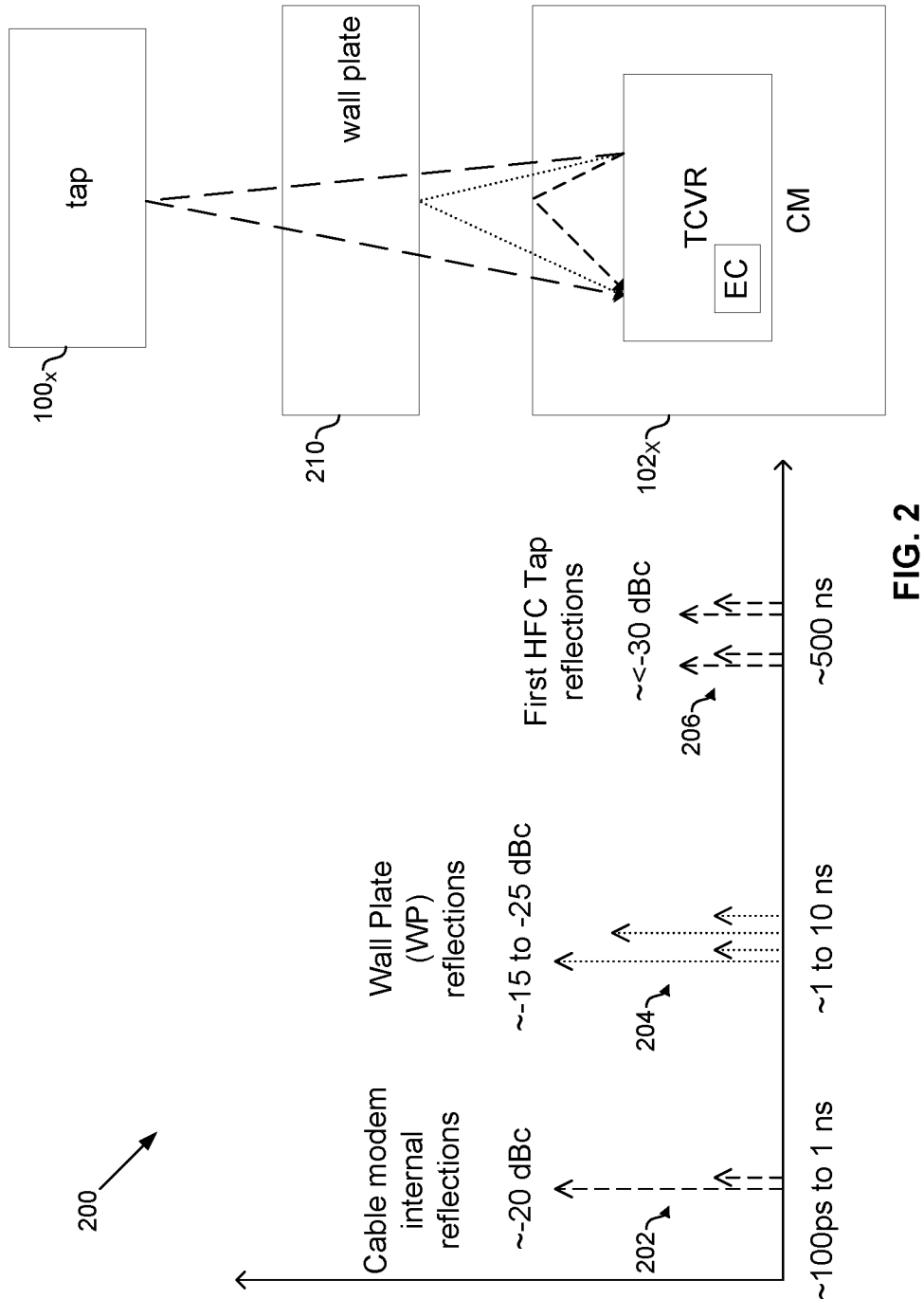
FIG. 2 shows an example full duplex echo profile at a cable modem in a cable network.

FIG. 2 shows an example full duplex echo profile at a cable modem in a cable network. The echo profile 200 represents an example echo scenario when a cable modem 102 is operating in full-duplex mode. In this regard, echo profiles may be quite complex due to a multitude of sources of echo signals—e.g., reflections off multiple connectors and taps. For example, the echo profile 200, as shown in FIG. 2, may correspond to echo occurring at the cable modem $102_6$ connected to tap 6 in the cable network 100 of FIG. 1A. The echo profile 200 may comprise three forms/types of echo signals: internal echoes 202 occurring within the cable modem itself (e.g., between a transceiver chip and an external connector); wall plate echoes 204, where the wall plate 210 is the first coupling connecting the cable modem $102_6$ to the HFC network; and echoes 206 from taps in the HFC network (only the reflection from the first tap is shown in FIG. 2 since it is the most significant reflection because it is the closest to the cable modem). The echo cancellation circuitry of the cable modem's transceiver attempts to cancel, at least in part, these echoes. To increase the effectiveness of the echo cancellation, the calibration procedure of FIG. 3 may be used during assembly/factory calibration of a cable modem 102.

Figure 4A:
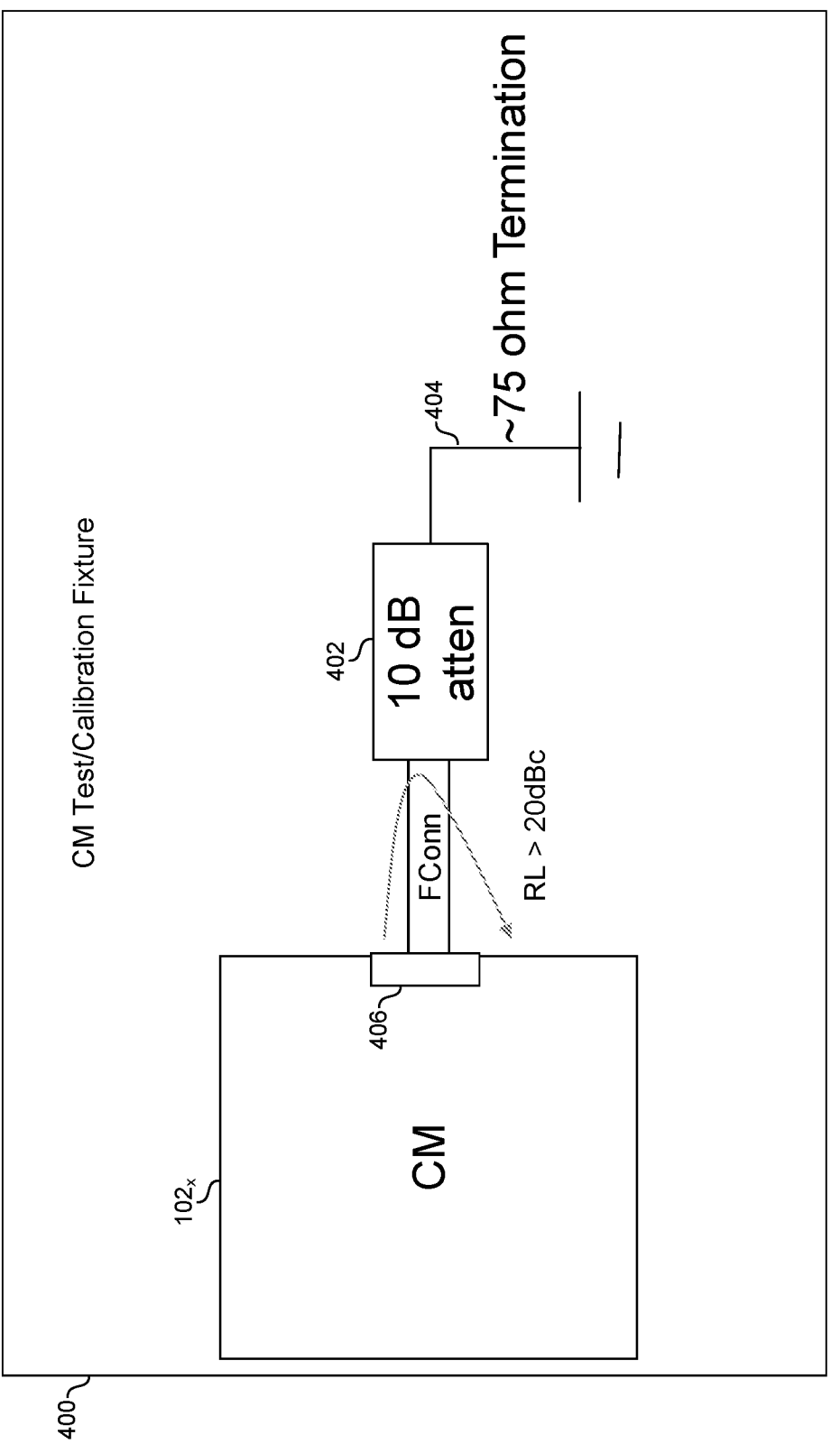
FIG. 4A shows a full-duplex cable modem in a test/calibration fixed.

FIG. 3 shows an example process for calibration of a full-duplex cable modem. The process begins with block 302 in which a full-duplex cable modem $102_X$ (e.g., any of the six cable modems shown in FIG. 1A) is placed in a test/calibration fixture. The test/calibration fixture may present a very accurate impedance match to the output of the cable modem 102. For example, referring briefly to FIG. 4A, an example test fixture 400 comprises an attenuator 402 (e.g., 10 dB attenuator shown, but may provide any other amount of attenuation such as 20 dB) and a 75 Ohm termination 404 coupled to cable modem $102_x$ via connector 406. The result is that echoes at the receive input of the cable modem 102 are less than −20 dBc.

Returning to FIG. 3, in block 304, cable modem $102_x$ selects a frequency band (or "resource block", for a DOCSIS full-duplex cable modem) on which to train its echo cancellation circuitry. For example, the cable modem $102_x$ may comprise a state machine or other control circuitry that autonomously cycles through all frequencies for which echo cancellation is to be trained (e.g., all resource blocks which, per the DOCSIS standard, may be used for both transmit and receive).

In block 306, the cable modem $102_x$ begins transmitting a training signal on the selected frequency and measuring resulting echoes to find optimal echo canceller coefficients for the selected frequency. The training may be done in the time domain or the frequency domain (e.g., using an overlap-add FFT, OFDM-based calibration signal, or a windowed multi-tone calibration signal). The signal may be transmitted by a DOCSIS full-duplex transmitter of the cable modem $102_x$ (e.g., a transmitter of the transceiver 420 described with respect to FIG. 4B), a Multimedia Over Coax (MOCA) transmitter of the cable modem (e.g., the MoCA transceiver 424 described with respect to FIG. 4B), or a signal synthesizer (e.g., signal synthesizer 426 described with respect to FIG. 4B).

In block 308, the cable modem records, in a non-volatile memory (e.g., memory 428 described with respect to FIG. 4B), the echo measurements and the echo canceller coefficients determined to be optimal for the selected frequency.

In block 310, if training has been performed for all desired frequencies, then the process completes in block 314. Otherwise the process returns to block 304 and the next frequency for which to train echo cancellation is selected.

Figure 4B:
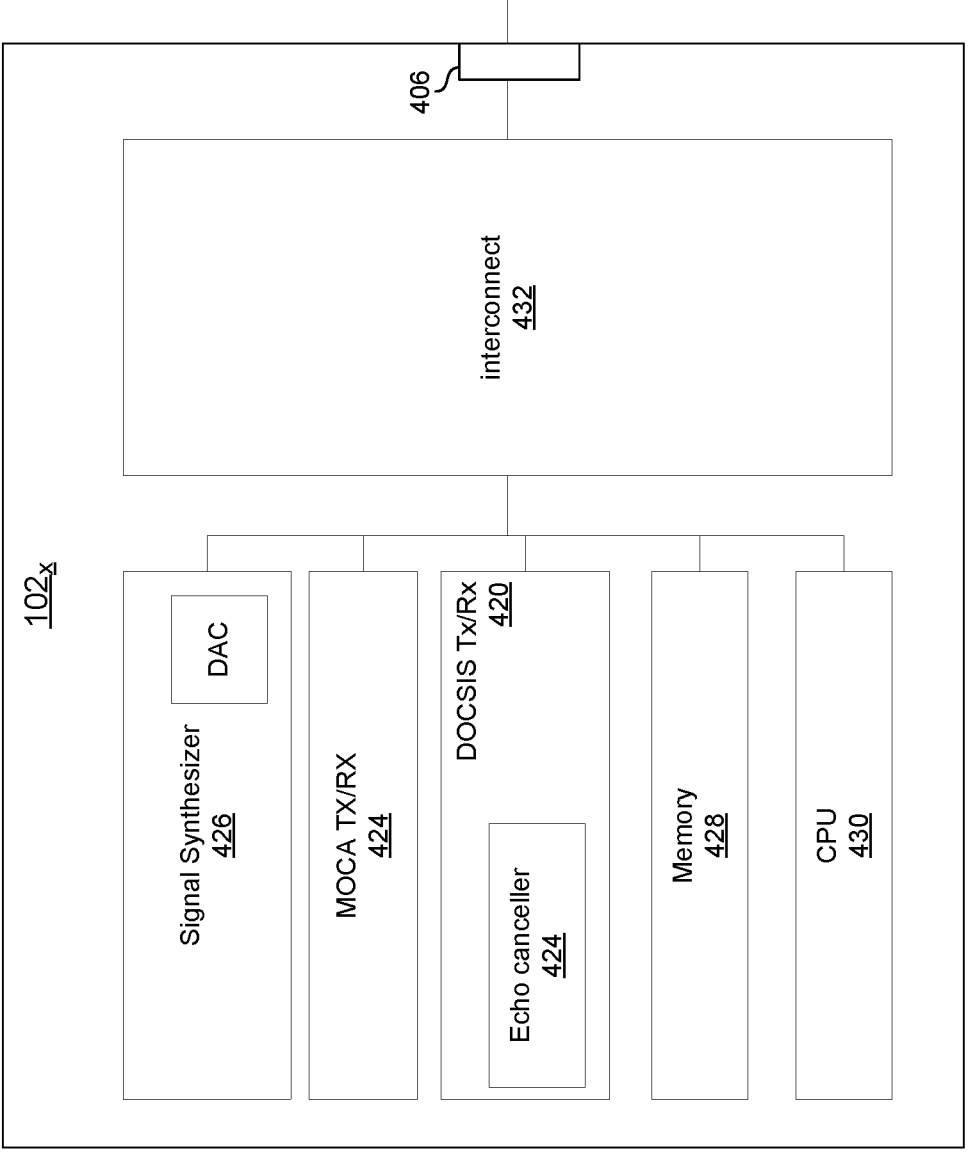
FIG. 4B shows an example implementation of cable modem in accordance with an example implementation of this disclosure.

FIG. 4B shows an example implementation of cable modem in accordance with an example implementation of this disclosure. The example cable modem $102x$ comprises DOCSIS transceiver 420, MoCA transceiver 424, Signal Synthesizer 426, memory 428, CPU 430, and interconnect 432.

The DOCSIS transceiver 420 comprises circuitry operable to transmit and receive DOCSIS signals in full-duplex mode. The transceiver 420 comprises echo canceller circuitry 424 operable to perform echo cancellation to support full-duplex DOCSIS communications.

The MoCA transceiver 424 comprises circuitry operable to transmit and receive signals in accordance with one or more MoCA® standard.

The signal synthesizer 426 comprises circuitry operable to read samples of a desired signal (e.g., an echo cancellation training signal with a desired echo profile signature) from memory 128 and output the samples through a digital to analog converter for output onto the HFC network via interconnect 432.

The memory 428 may comprise volatile and/or non-volatile memory for storing information such as the samples of a probe signal to be played by the signal synthesizer 426 and configuration settings/parameters (e.g., filter coefficients) used by circuits of the modem $102_X$ such as the echo canceller 424.

The CPU 430 comprises circuitry operable to execute instructions to perform the arithmetic, logic, and control operations of the cable modem $102_X$.

The interconnect 432 comprises active and/or passive components for routing signals between the various circuits of the cable modem $102_X$ and the connector 406 via which the cable modem $102_X$ connects to the HFC network.

As shown in FIGS. 5A and 5B, echo canceller training/calibration as described with reference to FIG. 4 may be performed in sequence, or in parallel, with calibration of received power level reporting.

In FIG. 5A, echo cancellation (denoted "Self-install calibration" or "SIC") is performed on all frequencies (or resource blocks "RB") at time t1 and then received power level reporting calibration (denoted "DS CAL") is subsequently performed at time t2.

In FIG. 5B, received power level reporting calibration is performed on resource block 1 and resource block 2 while echo cancellation is performed on resource block 3. Subsequently, at time t2, echo cancellation is performed on resource blocks 1 and 2 while received power level reporting calibration is performed on resource block 3.

Figure 6:
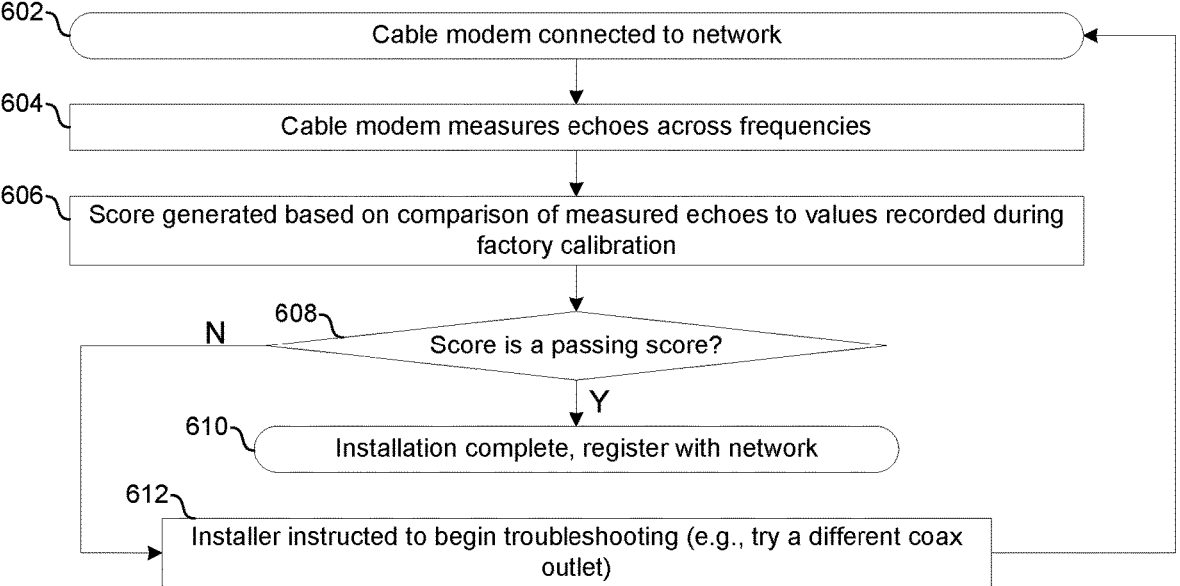
FIG. 6 illustrates an example run-time diagnostic process for field installation of a full-duplex cable modem.

FIG. 6 illustrates an example run-time diagnostic process for field installation of a full-duplex cable modem. In block 602, the cable modem $102_x$ is connected to a coaxial outlet in a subscriber's home or business.

In block 604, the cable modem $102_x$ trains on one or more frequencies and measures echoes on the one or more frequencies, similar to as described above with reference to FIG. 3. In some instances, the cable modem $102x$ may be permitted to sequentially cycle through all frequencies (or "resource blocks") as in FIG. 3. However, because the cable modem 102x is connected to the real network and not a test fixture, there may be instances where such autonomous selection of frequencies is not permitted (e.g., because it would interfere with other nodes on the network). In such instances, the cable modem may need to wait for grants to transmit training signals. The cable modem 102$_X$ then measures the echoes that result from the training signals.

In block 606, generates an installation quality figure of merit based on a comparison of the echoes measured in block 606 and the echo measurements recorded during factory calibration and stored in memory. The figure of merit may be, for example, a difference, a mean squared error, a measure of loss in dB, a measure of loss in throughput, or any other suitable metric.

In block 608, the cable modem 102$_x$ determines whether the score calculated in block 606 is a passing score (e.g., is it above a threshold value, is it below a threshold value, or the like). If the score calculated in block 606 is a passing score, then the process advances to block 610 and the installation of the modem 102$_x$ is complete. The cable modem 102$_x$ may then begin a network registration process in accordance with a DOCSIS standard, for example. In an example implementation, the passing score may be reported to the installer (e.g., transmitted via wire or wirelessly to a handheld device of the installer) and/or to a data center of the network provider so that the network provider can monitor the quality of its network throughout its subscriber base. This information is useful for, for example, troubleshooting problems for particular subscribers, for planning network upgrades, and/or the like.)

If the score is not a passing score, then the process advances to block 612 in which the cable modem generates an alert to alert the installer to begin troubleshooting (e.g., double check connections are tight, try different cables, try a different coaxial outlet in the house or business, etc.). For example, one or more lights on the cable modem 102$_x$ may flash, the cable modem 102$_x$ may generate an audio alert, the cable modem 102$_x$ may transmit (e.g., via WiFi, Bluetooth, USB, or any other suitable connection) the alert to a handheld device (e.g., a smartphone, a tablet or dedicated service device) of the installer, and/or the cable modem may transmit the alert back to a data center where it is monitored by remote technicians.

In accordance with an example implementation of this disclosure, a communication device (e.g., cable modem 102$_x$) operable to communicate in accordance with a Data Over Cable System Interface Specification (DOCSIS®) standard, comprises transmitter circuitry (e.g., 420, 424, and/or 426), receiver circuitry (e.g., 420), and memory (e.g., 428). The transmitter circuitry may be operable to transmit one or more first signals into a network (e.g., 100) to which the communication device is coupled. The receiver circuitry may be operable to measure echoes of the transmitted one or more first signals. The receiver circuitry may be operable to generate an installation figure of merit based on the measured echoes and factory-calibration echo measurements stored in the memory. The communication device may be operable to begin DOCSIS® network registration if the installation quality measurement meets a determined requirement and generate a notification to troubleshoot the installation of the communication device if the installation quality measurement does not meet a determined requirement. The transmission of the one or more signals (e.g., SIC signals of FIG. 5A) may be onto a plurality of resource blocks during a first time interval (e.g., t1 of FIG. 5A) and the measurement of the echoes of the transmitted one or more first signals may be during the first time interval. The receiver circuitry may be operable to, during a second time interval (e.g., t2 of FIG. 5A), measure received power levels of second signals (e.g., DS CAL signals of FIG. 5A) transmitted on the plurality of resource blocks by another communication device on the network. The second one or more signals may be used for transmit power calibration according to a DOCSIS® standard. The transmission may comprise transmission of the one or more first signals onto a first resource block (e.g., RB3 of FIG. 5B) during a first time interval (e.g., t1 of FIG. 5B) and transmission of the one or more first signals onto a second resource block (e.g., RB2 of FIG. 5B) during a second time interval (e.g., t2 of FIG. 5B). The measurement may comprise measurement of the echoes on the first resource block during the first time interval and measurement of the echoes on the second resource block during the second time interval. The receiver circuitry may be operable to measure, during the first time interval, received power levels of second signals transmitted on the second resource block by another communication device on the network (e.g., measure DS CAL signals on RB2 during t1 in FIG. 5B), and measure, during the second time interval, received power levels of second signals transmitted on the first resource block by another communication device on the network (e.g., measure DS CAL signals on RB3 during t2 in FIG. 5B). The one or more signals may comprise one or more DOCSIS signals. The transmitter circuitry may be configured to transmit signals in accordance with a Multimedia over Coax Alliance (MoCA®) standard and the one or more signals may be MoCA® probe signals. The transmission may comprise a reading of a plurality of probe signal samples from the memory and output of the probe signal samples via a digital-to-analog converter of the communication device. The transmission and measurement may occur automatically on power-up of the communication device. The one or more signals comprise a sequence of continuous wave tones transmitted per a DOCSIS® standard for assignment of cable modems on the network to interference groups. The one or more signals may comprise one or more orthogonal frequency division multiplexed (OFDM) upstream data profile signals transmitted, per a DOCSIS® standard for assignment of cable modems on the network to interference groups. The figure of merit may be a measurement of signal degradation (e.g., difference in signal to noise ratio).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   providing, at a customer premise equipment (CPE), a connection to a network;
   performing, by the CPE, an echo measurement across one or more frequencies, including identifying an upstream interference caused by an upstream transmission, the upstream interference being on an overlapping downstream frequency; and
   performing, by the CPE, an echo cancellation to reduce the upstream interference on the overlapping downstream frequency of a 4096 (4K) quadrature amplitude modulation (QAM) downstream signal.

2. The method of claim 1 further comprising training an echo canceller at the CPE.

3. The method of claim 2, wherein a cable modem termination system (CMTS) assists in coordinating upstream and downstream transmissions to allow the CPE to train the echo canceller.

4. The method of claim 3, wherein the CMTS is involved with interference avoidance, echo cancellation, and scheduling of communication signals.

5. The method of claim 2, wherein training the echo canceller at the CPE comprises operations:
   selecting a frequency band;
   transmitting a training signal on the selected frequency band;
   measuring resulting echoes in the frequency band; and
   determining one or more echo canceller values for cancelling the echoes in the frequency band.

6. The method of claim 5, wherein training the echo canceller at the CPE further comprises repeating the operations of claim 5 for a different frequency band.

7. The method of claim 1, wherein the network is configured as a full-duplex (FDX) Data Over Cable Service Interface Specification (DOCSIS) network.

8. The method of claim 1, the one or more frequencies relating to at least one resource block for a Data Over Cable Service Interface Specification (DOCSIS) device.

9. A method, comprising:
   providing, at a customer premise equipment (CPE), a connection to a network;
   performing, by the CPE, a built-in run-time diagnostic to identify an interference; and
   generating, by the CPE, an alert indicative of upstream interference, the upstream interference being on an overlapping downstream frequency of a 4096 (4K) quadrature amplitude modulation (QAM) downstream signal.

10. The method of claim 9 further comprising transmitting the alert indicative of the interference to a network operator.

11. The method of claim 9, the interference being an upstream interference caused by an upstream frequency transmission.

12. The method of claim 11 further comprising performing an echo cancellation to reduce the upstream interference on the overlapping downstream frequency.

13. The method of claim 12, wherein the echo cancellation is to reduce the upstream interference on the overlapping downstream frequency by at least 50 dB.

14. The method of claim 11 further comprising causing an echo cancellation to be performed to reduce the upstream interference on the overlapping downstream frequency.

15. The method of claim 9, wherein a cable modem termination system (CMTS) assists in coordinating upstream and downstream transmissions to allow training of an echo canceller.

16. The method of claim 15, wherein the CMTS is involved with interference avoidance, echo cancellation, and scheduling of communication signals.

17. The method of claim 9, the interference including at least one of an adjacent channel interference (ACI) or an adjacent leakage interference (ALI).

18. The method of claim 9 further comprising:
   performing a calibration on a first resource block and a second resource block at a first time;
   performing a received power level reporting calibration on the first resource block at a second time; and
   performing an echo cancellation on the second resource block.

19. The method of claim 9 further comprising:
generating an installation quality figure of merit based on a comparison of the interference and an echo measurement recorded during a factory calibration.

\* \* \* \* \*